Nov. 7, 1967  V. D. ROOSA  3,350,963

NOZZLE DRILLING MACHINE

Filed May 14, 1965  3 Sheets-Sheet 1

INVENTOR.
VERNON D. ROOSA
BY
Lindsey, Prutzman and Hayes
ATTORNEYS

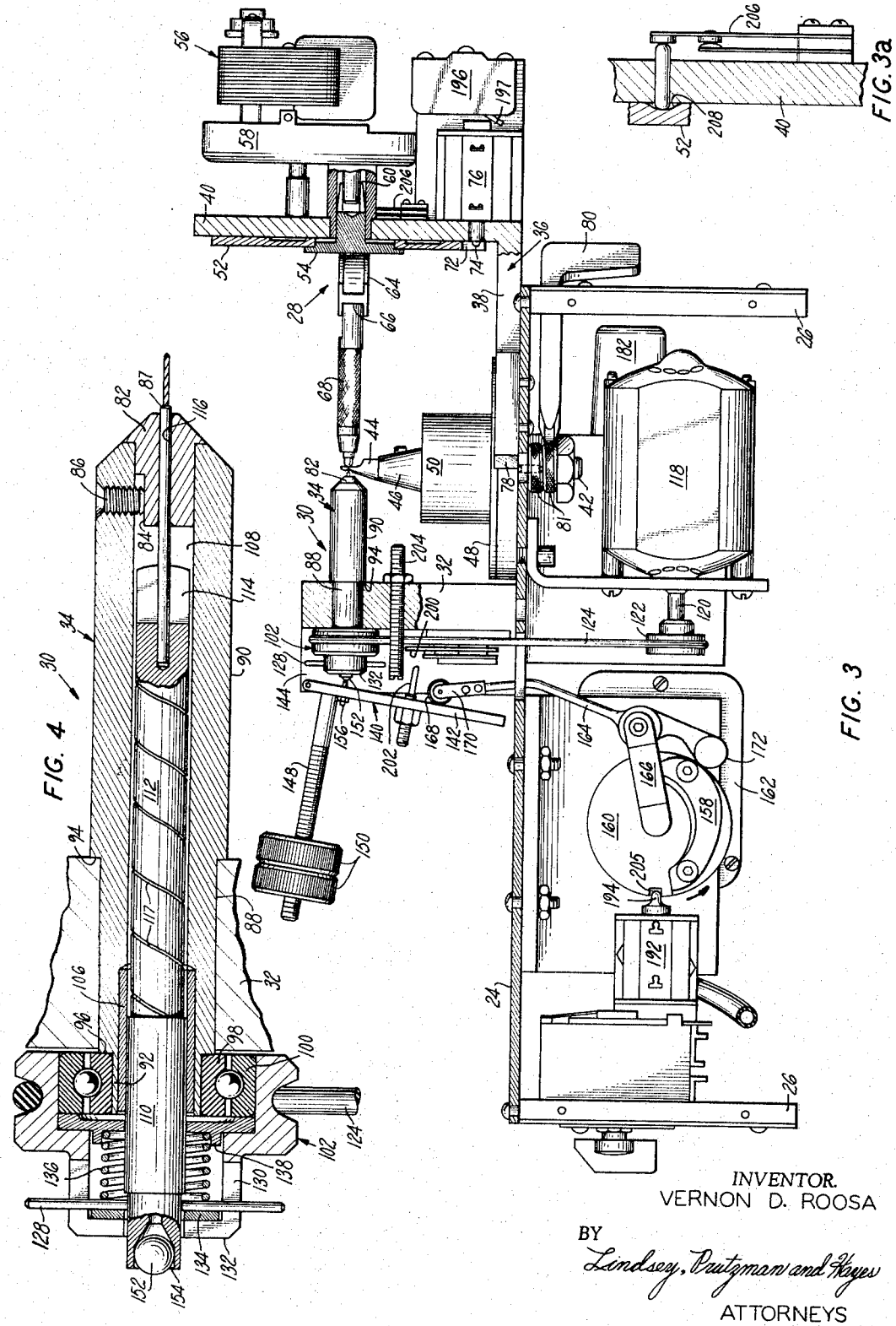

Nov. 7, 1967 V. D. ROOSA 3,350,963
NOZZLE DRILLING MACHINE
Filed May 14, 1965 3 Sheets-Sheet 3

INVENTOR.
VERNON D. ROOSA
BY
Lindsey, Prutzman and Hayes
ATTORNEYS

United States Patent Office 3,350,963
Patented Nov. 7, 1967

3,350,963
NOZZLE DRILLING MACHINE
Vernon D. Roosa, c/o Hartford Machine Screw Co.,
Hartford, Conn. 06101
Filed May 14, 1965, Ser. No. 455,913
15 Claims. (Cl. 77—32.2)

ABSTRACT OF THE DISCLOSURE

An automatically controlled drilling machine having a workpiece holder and an anvil for positioning a workpiece to be drilled at an adjusted angular relationship with respect to the axis of reciprocation of the drill, the holder being rotatable for drilling a plurality of holes in the workpiece at preselected indexed locations, and including a reciprocating drill holder driven by a belt drive having a drive connection constructed to eliminate lateral forces on the drill holder, an automatic cam controlled drill advancing mechanism for positively controlling the rate of feed of the drill, interlocking control means for withdrawing the drill after it has advanced a preselected distance and for indexing the workpiece holder and repeating the drilling operation until a prescribed series of drilling operations on the workpiece are completed.

---

This invention generally relates to machine tools and more particularly concerns machines of the type for drilling discharge orifices in the tip of a fuel injection nozzle.

A primary object of the present invention is the provision of an improved machine which can be readily adjusted to drill a plurality of discharge orifices in any preselected arrangement in a nose blank to provide a finished discharge tip for fuel injection nozzles having customized spray patterns for engine combustion chambers of different design.

Another object of the present invention is the provision of a machine of the type referred to which can be conditioned for an automatic drilling operation wherein a plurality of discharge orifices are drilled in succession to provide high speed production of finished discharge tips for fuel injection nozzles.

A further object of the present invention is the provision of a nozzle drilling machine having an improved workpiece positioning device for automatically moving a nose blank through a series of predetermined positions relative to the drilling axis for selective drilling of discharge orifices. Included in this object is the provision of an arrangement for positively controlling the precise position of the nose blank during the drilling operation.

Another object of the present invention is the provision of a nozzle drilling machine having a drive mechanism wherein the forces acting on the drill bit are precisely controlled. Included in this object is the provision of an improved arrangement for powering the drill bit without subjecting it to side thrust.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 3 is an enlarged side view, partly broken away and partly in section, of the machine of FIG. 2 with parts removed for clarity of illustration;

FIG. 3a is an enlarged fragmentary view, partly broken away and partly in section, of a finish program switch incorporated in the machine.

FIG. 4 is an enlarged, fragmentary side view, partly broken away and partly in section, of the drill spindle of the machine;

Figure 1:
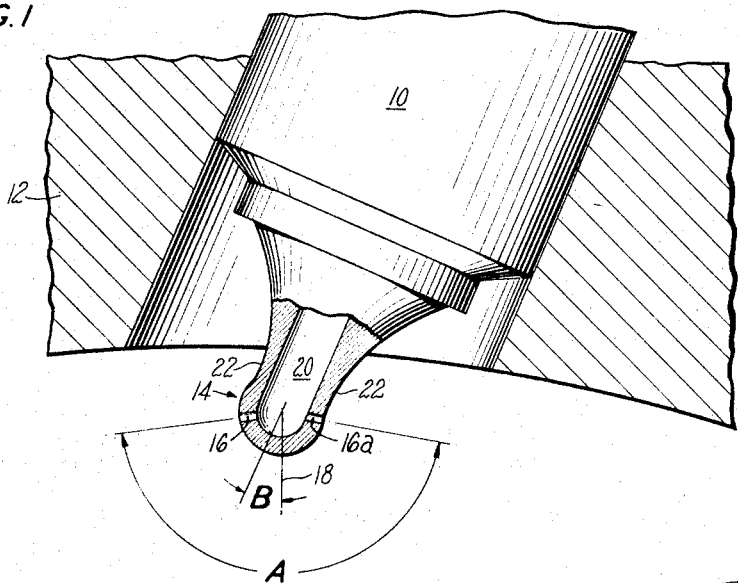
FIG. 1 is a side view, partly broken away and partly in section, of a fuel injection nozzle installed in an engine.
Figure 2:
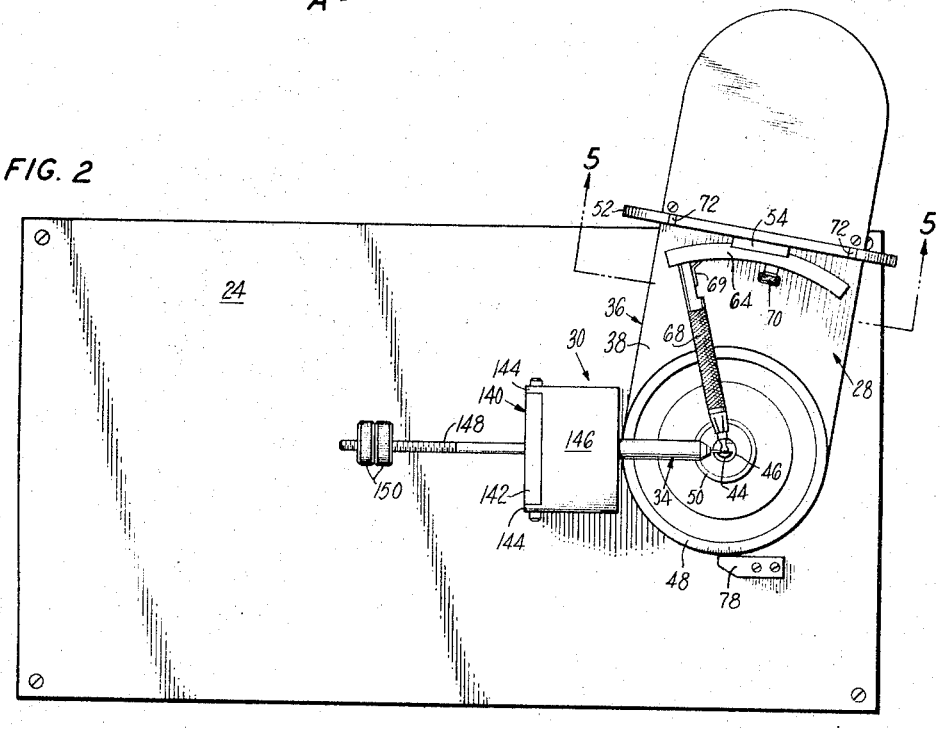
FIG. 2 is a top plan view of a nozzle drilling machine made according to this invention.

Referring now to the drawings in detail, a fuel injection nozzle 10 is illustrated in FIG. 1 as being installed in the head of a diesel engine 12 to discharge fuel into a combustion chamber of the engine.

The manner and uniformity with which the fuel is mixed with the air in the combustion chamber is important in the efficiency of the combustion of the fuel. In most engines it is necessary to install the fuel injection nozzle with the axis thereof at an angle with the longitudinal centerline of the combustion chamber. Thus, it is important to provide a fuel injection nozzle in which the tip has discharge orifices arranged asymmetrically relative to the longitudinal axis of the nozzle to spray the fuel into the combustion chamber for optimum mixture with the air.

In accordance with one aspect of the present invention, a workpiece or nose blank 14 is provided which is to be drilled with a plurality of discharge orifices such as at 16 and formed into a finished discharge tip for a fuel injection nozzle wherein the axis 18 of the spray pattern may be offset at a preselected angle B from the longitudinal axis of the nozzle thereby to depress the spray angle A relative to the axis of the nozzle to assure a good fuel and air mixture in the engine combustion chamber. The discharge tip has an elongated bore 20 open at one end and closed at the opposite end. The open end of the discharge tip communicates with the nozzle body 10 with its bore 20 coaxially aligned with the longitudinal axis of the body 10. The outer surface of the discharge tip is parti-spherical in shape and has a longitudinal cross section greater than that of a semi-circle to provide a necked down portion 22 between the opposite ends of the nose blank.

In addition to providing an arrangement in which discharge orifices of the same size may be drilled for various angles of spray and depression for engines of different design without changing the drilling fixture, the parti-spherical discharge tip is particularly suited to provide easy and accurate drilling. This is true even though the discharge orifices are to be located at an angle of more than 90° with the axis of the nozzle 10. For example, the spray angle A (shown in FIG. 1 as being approximately 160°) is symmetrical relative to the spray axis 18 which is illustrated as being offset from the longitudinal axis of the nozzle body 10 at a depression angle B of, say, 23° requiring one of the discharge orifices 16a to be disposed at an angle of approximately 103° relative to the longitudinal axis of the nozzle body 10. Because of the annular necked down portion 22 of the discharge tip, an orifice such as 16a having an axis passing through the center of the parti-spherical tip may be formed by a drill bit which is perpendicular to a tangential plane at the point of its engagement with the nose blank from which the tip is made. The drill bit thus in effect engages a substantially flat drilling surface and is essentially free from lateral drift even though the drill bit may be, say, 0.006" in diameter. It will therefore be readily apparent that the use of a necked down parti-spherical nose blank provides a construction which can be readily drilled to provide a plurality of discharge orifices having any desired spray pattern.

Referring now to FIGS. 2–5 of the drawings, there is illustrated the drilling machine of this invention. Briefly, the machine includes a workpiece positioning device for holding a nose blank with the longitudinal axis of the nose blank positioned at a desired angle to the drilling axis. The nose blank is held in locked position by the workpiece positioning device during the drilling of a discharge orifice. Thereafter the drill is withdrawn from the orifice of the workpiece and the power driven index plate of the workpiece positioning device is automatically rotated relative to the drilling axis to position the nose blank for a subsequent drilling operation. The discharge orifices are thus successively drilled in an entirely automatic operation to provide a finished discharge tip for a nozzle having a preselected spray angle and pattern as determined by the particular relative angular adjustments of the workpiece positioning device and the drill axis as well as the particular index plate utilized. After a discharge tip has been completed, the machine then automatically assumes a nonoperative condition so that the finished discharge tip may be safely removed and another workpiece inserted in the workpiece positioning device.

The preferred embodiment of an automatic nozzle drilling machine of FIGS. 2–5 is illustrated as having a table-like frame with a rectangular platform 24 supported at each corner by a post 26. Various mechanical and electrical components of a workpiece positioning device 28 and a drill mechanism 30 are mounted on the platform 24. The drill mechanism 30, described more specifically below, includes a support 32 secured upon the platform 24 and a drill holder 34, horizontally mounted to project outwardly from support 32, it being understood that a drill is supported by the drill holder 34 adjacent its outer end for reciprocating movement along a fixed drilling axis.

An L-shaped mounting bracket generally designated 36, supports the workpiece positioning device 28 and includes a horizontal base plate 38 and a vertical wall 40 extending upwardly from one end of the base plate 38. The opposite end of the base plate 38 is illustrated as being semicircular with a pivot pin 42 at the center thereof extending downwardly through the platform 24 to pivotally secure the mounting bracket 36 with its vertical pivot axis intersecting the horizontal drilling axis adjacent the working end of the drill mechanism 30.

A workpiece anvil 44 is fixedly mounted upon a cone-shaped pedestal 46 supported on the base plate and centrally positioned inside a circular protractor 48 which is fixed upon the semicircular end of base plate 38 concentric with the pivot axis of the mounting bracket 36. The uppermost portion of the anvil 44 is shaped to mate with the discharge tip of a workpiece to precisely position and support the same with the center thereof on the axis of the drill holder 34, it being understood that the anvil 44 is suitably apertured by a slot or the like to enable the drill to pass therethrough. The anvil 44 is adapted to be locked by any suitable means in a vertically adjusted position on top of pedestal 46. The latter is preferably surrounded by an annular wall 50 extending upwardly from its base for containing metal particles, oil and the like, incidental to the drilling of a discharge tip.

Rotatably mounetd on the vertical wall 40 of the L-shaped mounting bracket 36 is a circular index plate 52 having a central hub 54 drivingly connected through suitable gearing to a motor 56 of any suitable type, which is mounted on the side of wall 40 opposite index plate 52. The gearing is contained within a gear housing 58 mounted adjacent the index motor 56 and a slip clutch 60 is provided for selective rotation of the index plate 52. It will be noted that the rotational axis of the index plate 52 extends through the point of intersection of the pivot axis of the mounting bracket 36 and the drilling axis.

Figure 5:
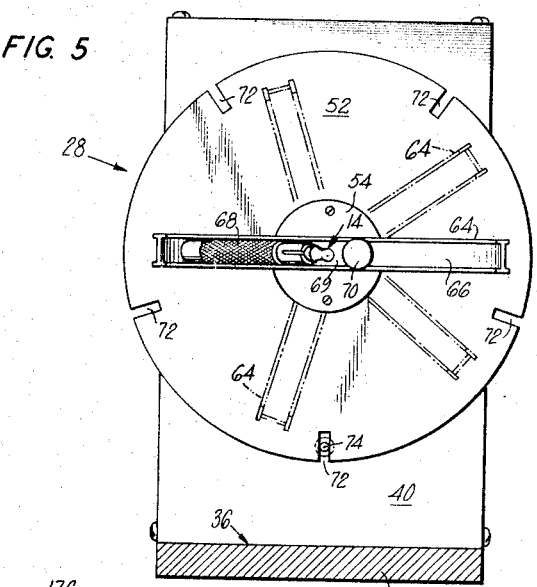
FIG. 5 is an enlarged front view, taken along lines 5—5 of FIG. 2, of the indexing device of the machine.

An arcuate protractor 64 is fixed at its midpoint to the hub 54 of the index plate 52 and includes a channel 66, best seen in FIG. 5, for receiving the rear end of a cylindrical chuck 68 for holding a workpiece in position on the anvil 44. The chuck 68 may be adjustably secured within the channel 66 by means of a spring blade 69 (FIG. 2) which is located and retained by an adjusting screw 70 in a preselected position. The chuck 68 is thus adapted to hold the workpiece on the anvil 68 with its longitudinal axis offset at a desired angle to the rotational axis of the index plate 52 for rotation relative to the drilling axis for selective nozzle drilling.

As best shown in FIG. 5, a slot 72 is preferably directed radially inwardly from the periphery of the circular index plate 52 to correspond with the placement of each discharge orifice desired in the nose blank. In the illustrated embodiment of this invention, index plate 52 is shown as having five such slots 72 equiangularly spaced from one another to correspond with a series of five equally spaced apart discharge orifices 16 desired in the finished discharge tip for the fuel injection nozzle.

For locking the index plate 52 in a desired position, a normally extended index pin 74 is illustrated as projecting through the vertical wall 40 adjacent the bottom of the index plate 52 just inside its periphery so that the index pin 74 is adapted to be received in the radial slots 72 to lock the index plate 52 against rotation during the drilling operation. The index pin 74 is preferably electromechanically actuated by an adjacent index solenoid 76 which is adapted to momentarily withdraw the index pin 74 from an aligned slot 72 after the corresponding discharge orifice has been drilled. The index plate 52 is thereby released to rotate, under the power of the index motor 56, to the next slot for the drilling of another orifice in the nose blank, the index pin 74 having been released in the meantime so as to be conditioned to extend into the approaching slot to halt the rotation of the index plate.

The slip clutch 60 shown in the specific illustrated embodiment of the invention thereby provides effective backlash control when the index plate 52 is held against rotation by the index pin 74, it being understood that any drive providing constant torque could be provided by other means such as a stalled motor drivingly connected directly to the index plate 52. It is particularly important that there is virtually no shock imparted to the workpiece mounted on the anvil 44 in view of the precision drilling of discharge orifices having a diameter in the order of 0.01″.

The workpiece or nose blank is initially marked by a notch or the like to provide a reference relating to its subsequent installation in the engine and is thereafter secured in a preselected position in the chuck 68. If it is desired to have the discharge orifices provide a spray angle A of 160° which is offset from the longitudinal axis of the nozzle body 10 at an angle of depression B of 23°, for example, the entire L-shaped mounting bracket 36 is pivoted from the position shown in FIG. 3, where the spray axis 18 is coaxially aligned with the drilling axis of the drill mechanism 30, through an angle equal to one-half the desired spray angle A (80° in the specific example) to that position shown in FIG. 2. The extent of rotation is indicated by indicia on the circular protractor 48 in reference to an established point such as that provided by marker 78 secured to the platform 24 adjacent the semicircular end of the base plate 38. The mounting bracket may then be fixed in adjusted position by means such as the locking lever 80 engageable with one of a pair wedge plates 81 secured to the pivot pin 42 underneath the platform 24.

The workpiece is thereafter positioned on the anvil 44, and the chuck 68 is secured on the index plate 52 in the channel 66 of the index protractor 64 at an angle of 23° from the center of the index plate to establish the angle of depression B.

In view of the above-described structure, an operator may easily condition the machine to form orifices in an arrangement providing a selected spray angle A depressed at a desired angle B from the longitudinal axis of the nozzle body 10 to provide a discharge tip customized for a particular engine design.

Referring now to the drill mechanism 30, the bit end of the drill holder 34 is positioned adjacent the anvil 44 and is provided with a bushing 82 preferably having a flat 84 engageable with a set screw 86 firmly holding the bushing 82 in position for supporting and guiding a drill bit 87 for precision drilling of the workpiece, the drilling axis being radially directed toward the center of the partispherical discharge tip supported by the anvil 44.

Drill holder 34 is illustrated in FIG. 4 as having a cylindrical, tripartite outer surface comprising an intermediate barrel segment 88 formed between a larger forward barrel segment 90 and a smaller rear barrel segment 92. Shoulders 94 and 96 are formed at the rear of the forward and intermediate barrel segments 90 and 88, respectively, in reducing to the next barrel segment of smaller diameter, thereby to sharply define opposite ends of the intermediate barrel segment 88. The latter is preferably press fit within an opening formed near the top of the support 32 with the shoulder 94 at the rear of the forward barrel segment 90 abutting the front face of the support 32. The intermediate barrel segment 88 extends rearwardly through the support 32 with rear shoulder 96 spaced a short distance outside the rear face of the support 32. The rear barrel segment 92 thus provides a seat for a stationary inner race 98 of an annular ball bearing having an outer race 100 secured within a spindle drive pulley 102 which is rotatably mounted adjacent the rear face of the support 32 with clearance therebetween being provided by shoulder 96 at the rear of intermediate barrel segment 88.

The rear of the drill holder 34 is provided with a bushing 106 which lines the inside of the rear barrel segment 92 and part of the intermediate barrel segment 88, the bushing 106 having an inside diameter equal to the internal bore 108 of the drill holder 34. The bushing 106 provides bearing support for the collar 110 of an elongated spindle 112 which is received in bore 108 for rotational and axial movement within the drill holder 34. At the forward end of spindle 112 is a collet 114 for securing drill bit 87 in coaxial alignment with the bore 116 formed in the bushing 82 at the bit end of the drill holder 34.

Bits of metal dirt and the like are prevented from entering the bore 108 of the drill holder by the advancing helical groove 117 formed on the surface of spindle 112 whereby a lubricating medium such as oil is continuously propelled toward the bit end of the drill holder 34 when the spindle 112 is rotating, thereby preventing the entry of any foreign particles which would interfere with the operation of the drill mechanism 30.

Rotary movement of the spindle 112 is provided by an electric motor 118 suitably mounted below platform 24 with an output shaft 120 having a pulley 122. The pulley belt 124 drivingly connects pulley 122 and the spindle drive pulley 102.

It is important to prevent lateral forces from being imposed on the spindle 112 since with a small diameter drill of the type utilized, such forces may cause the tip of the drill to be laterally displaced, or wobble, as it engages the workpiece. According to this invention, this problem is overcome by transmitting the torque of the spindle drive pulley 102 to spindle 112 by a pin and slot coupling. The pin 128 extends through spindle 112 perpendicular to its longitudinal axis with the pin 128 being secured by a press fit behind the collar 110 adjacent the rear end of the spindle. The pin 128 is movable within a slot 130 in a cap 132 illustrated as being of reduced diameter and integrally formed on the rear end of spindle drive pulley 102, and the opposite ends of pin 128 are positioned outside diametrically opposed sides of the cap 132 so as to rotate the spindle 112 in response to rotational movement of the spindle drive pulley 102.

The pin 128 engages an annular washer 134 against which the pin is pressed by a coil compression spring 136 surrounding spindle 112 and which spring is seated on an annular spring guide 138 bearing against the outer race 100 of the ball bearing. The spindle 112 is thus urged by the spring 136 into a normally retracted position with collet 114 spaced apart from bushing 82 at the bit end of the drill holder 34 and with the rear end of the spindle 112 protruding from a central aperture in the cap 132.

In order to axially advance spindle 112 within the bore 108 of drill holder 34 to accurately drill the discharge orifices and yet maintain the drill mechanism 30 free from lateral movement, or wobble, which would cause the drill to wiggle out of alignment and result in oversize orifices, the protruding rear end of the spindle 112 is force loaded through point contact by means of a drill operator 140.

More specifically, the drill operator 140 comprises a pivot plate 142 positioned behind cap 132 of the spindle drive pulley 102. The top of the pivot plate 142 is bolted to the side walls 144 (only one shown in FIG. 3) provided by a cover portion 146 of the support 32, the side walls 144 extending rearwardly from the housing. A threaded rod 148 is cantilever mounted on pivot plate 142 to project away from the drill holder 34. Positioned on the free end of rod 148 is a weight of any suitable type such as the circular plates 150 which will be understood to include threaded openings for adjusting their position to provide preselected leverage urging the pivot plate 142 to swing forwardly toward the cap 132.

The drill operator 140 is thus adapted to cooperate with a ball 152 rotatably mounted in part within a recess 154 in the protruding rear end of spindle 112 thereby to provide point contact engagement with the surface of the ball 152 during the advancement of the spindle 112 actuated by the weight of the pivot plate 142. The ball 152 is preferably retained within recess 154 with the end of spindle 112 being crimped over so that the ball is free to rotate but at the same time is prevented from being removed. In order to provide a fine adjustment governing the depth of drilling and at the same time maintain the contact with the spindle 112 free from lateral movement a suitable projection such as the illustrated set screw 156 is secured to pivot plate 142 to extend forwardly therefrom for coacting with the ball 152.

The position of the pivot plate 142 relative to the rear end of the spindle 112 is controlled by a cam 158 which is fixed to a disc 160 rotatably mounted on the frame below platform 24. The disc 160 is driven by a continuously operating motor 162 which is selectively engageable with the disc 160 through gearing which will be understood to have a slip clutch or the like similar to that of the index motor 56 for providing constant torque. A driving connection is provide between the cam 158 and the pivot plate 142 by means of a lever arm 164 pivotally secured intermediate its ends to one end of a retaining link 166, the opposite end of the link 166 being pivotally connected to the center of disc 160.

The upper end of the lever arm 164 includes a ball 168 secured by a support bracket 170 to ride on the surface of the pivot plate 142. The lower end of the lever arm 164 has a cam follower 172 engageable with the arcuately extending camming edge of cam 158. By this arrangement, the cam follower 172 oscillates the lever arm 164 when the disc 160 is rotated in a counter-clockwise direction whereby the pivot plate 142 is swung back and forth to advance and retract the spindle 112 and axially reciprocate the drill.

In general, the actual operation of the nozzle drilling machine essentially comprises a series of alternate drill and index cycles. After having set the desired angles of spray and depression, A and B, and with the index pin 74 engaged in a starting slot 72 to initially lock the index plate 52 in position, the tip of the workpiece is properly located on the anvil 44 and the chuck 68 is mounted on the index plate 52 in a preselected position within the channel 66 of the protractor 64.

After the machine has been connected to a suitable source of electrical power and conditioned for the initial drill cycle for drilling a single orifice, as described more specifically below, the index plate 52 will remain locked in its starting position throughout the drill cycle as the drill is advanced to form a discharge orifice in the nose blank and thereafter retracted from the workpiece. The power driven cam 158, which controls the position of the drill operator 140, is then locked against movement to maintain the drill in a retracted position to complete the initial drill cycle. The index cycle then takes place as the index plate 52 is released to move and rotate the tip of the workpiece on the anvil 44 to the next drill position. The index cycle is completed when the index plate 52 is again locked, and the following drill and index cycles alternately recur with the index plate 52 periodically moving to new positions, as indicated by the dotted lines in FIG. 5, until it has returned to its starting position after all the discharge orifices have been drilled. The motors 56 and 162 driving the index plate 52 and the cam disc 160, respectively, are then automatically shut off to permit safe removal of the drilled nose piece and insertion of another nose blank. Only the spindle motor 118 runs continuously during the time that power is applied to the machine.

Figure 6:
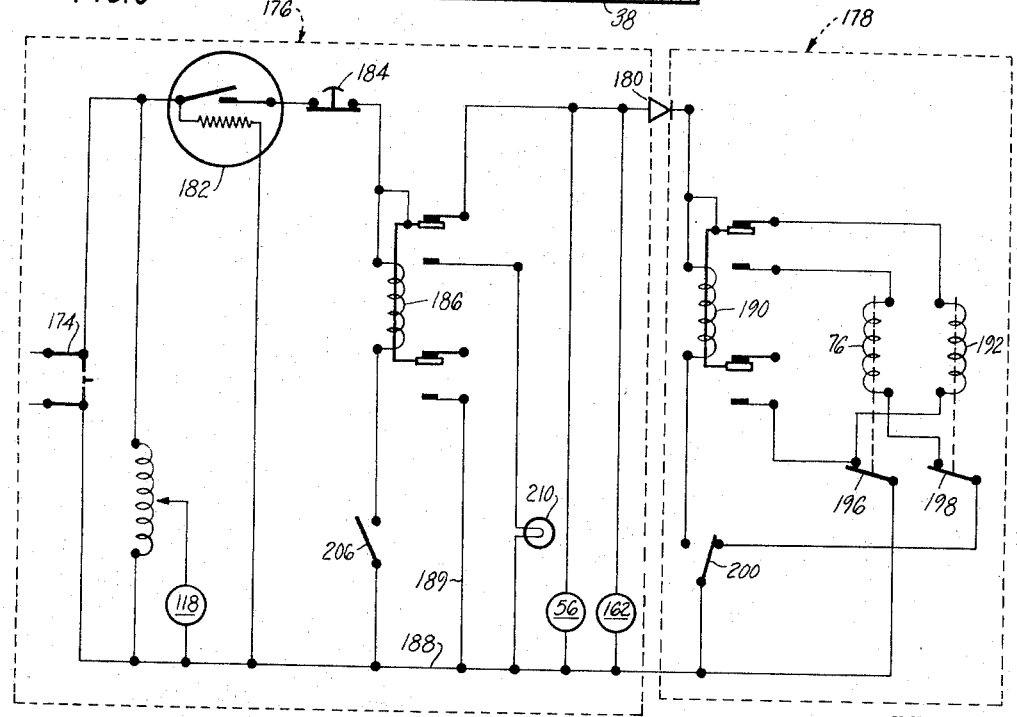
FIG. 6 is a schematic diagram of the electrical control system incorporated in the machine.

Referring now to the schematic electrical diagram in FIG. 6 in conjunction with the previously described figures, the electrical control system includes a master switch 174 for connecting the system to a source of electrical power which, in the specific illustrated embodiment, is a conventional alternating current 110–120 volt source. Generally, the electrical control system includes two circuits: a motor power circuit, designated 176, directly connected to the power source through the master switch 174, and a cycle control circuit, designated 178, which is connected to the motor power circuit 176 through a rectifier 180 having a direct current output.

The spindle motor 118 is shown as being a variable speed motor to provide speed adjustment for the rotation of the spindle 112. In order to allow the spindle motor 118 to reach a selected speed before initiating the drill cycle, a cycle initiating relay 182 of the time delay type is connected in parallel with the spindle motor 118 across the power terminals. The various switch and relay contacts are illustrated in FIG. 6 as being either open or closed to correspond with their normal condition after the master switch 174 has been closed to apply power to the spindle motor 118, but before completion of the time delay period. The cycle initiating relay 182 provides a delay in the order of 10 seconds before closing to apply power through the normally closed contacts of a restart button 184 to the index motor 56 and the cam motor 162 which are connected in parallel series with a normally closed, upper contact of a de-energized program control relay 186 to a common lead line 188. Thus, after the initial 10-second delay all three motors in the motor power circuit 176 will be running.

At the same time that the AC power is applied to the index motor 56 and the cam motor 162, the DC output of the rectifier 180 in series with the program control relay 186 is applied through a normally closed upper contact of a cycle control relay 190 in the cycle control circuit 178 to a drill solenoid 192. The drill solenoid 192 is shown in FIG. 3 as being mounted to the frame below platform 24 and having a plunger 194 engageable with the cam disc 160 to hold the pivot plate 142 in a non-operative condition. The cycle control circuit 178 is completed through a drill interlock switch 196 electrically connected in series with the drill solenoid 192 to the common lead line 188. A lever 197 of the drill interlock switch 196 is operated by the index solenoid 76 positioned behind the index plate 52 (FIG. 3). The armature of the index solenoid 76 also maintains the index pin 74 in an extended condition, to lock the index plate 52, and simultaneously assures that the drill interlock switch 196 is normally closed when the index solenoid 76 is de-energized thereby to complete the path to common lead line 188 to energize the drill solenoid 192.

As a result of the energization of the drill solenoid 192, its armature withdraws the plunger 194 to release the cam disc 160 and at the same time opens an index interlock switch 198, electrically connected in series with the index solenoid 76, to assure that the index solenoid 76 remains de-energized during the drill cycle.

The spindle 112, which is now rotating at an adjusted speed, is provided with a controlled axial advance as the lever arm 164 pivots clockwise in response to the movement of the cam 158 which is revolving in a counter-clockwise direction. In order to provide gentle initial contact between the drill and the tip of the workpiece, the camming edge of cam 158 is shown as being arcuately curved gradually inwardly from the periphery of the cam disc 160 such that the cam follower 172, at the lower end of the lever arm 164, causes the ball 168, on the upper end of the lever arm 164, to initially move slowly down the pivot plate 142 before the cam follower 172 rides off the end of the cam 158 to release the pivot plate 142 which then freely swings forwardly under the weight of the plates 150 to complete the drilling of the discharge orifice in the workpiece.

As the pivot plate 142 swings to its forward extreme, a limit or finished hole switch 200, illustrated as being positioned below the spindle drive pulley 102, is tripped by any suitable means such as the stud 202 projecting forwardly from the pivot plate 142. The extreme forward movement of the pivot plate 142 is checked by an adjustable mechanical stop such as that provided by threaded pin 204 extending rearwardly through the support 32 toward the pivot plate 142.

Thus, it will be seen that the drill solenoid 192 remains energized until the discharge orifice is completely drilled in the nose blank at which time the finished hole switch 200 is tripped to simultaneously energize the cycle control relay 190 and thus de-energize the drill solenoid 192, thereby completing the initial drill cycle and also initiating the first index cycle.

As a result of the de-energization of the drill solenoid 192, its armature releases plunger 194 to stop the cam disc 160 upon registry of plunger 194 which a notch 205 of cam disc 160 at which time the cam follower 172 has reengaged the cam 158 to cause the lever arm 164 to pivot counter-clockwise and swing pivot plate 142 back to its original starting position. It will be noted that the spindle 112 at this point has been withdrawn to a retracted position under the influence of the spring 136 of the spindle drive pulley 102.

When the drill solenoid 192 is de-energized, it also operates to close the index interlock switch which is in series with the index solenoid 76. The index solenoid 76 is then energized upon the release of the finished hole switch 200, by the withdrawal of the pivot plate 142, through the lower contacts of the energized cycle control relay 190. The cycle control relay 190 remains energized during the release of the finished hole switch 200 through the drill interlock switch 196 which remains closed until the index solenoid is energized.

Upon the energization of the index solenoid 76, its armature withdraws the index pin 74, to release the index plate 52 for rotation under the power of the index motor 56, and simultaneously opens the drill interlock switch 196.

Since the index pin 74 cannot return to its normally extended position while it is engaged with the back of the index plate 52, the drill interlock switch 196 is held open during the rotation of the index plate 52 until index pin 74 enters the approaching slot 72 to lock the index plate and therefore, the workpiece, in position for the drilling of the next discharge orifice. With the index pin 74 holding the index plate 52 against rotation, the index cycle is completed, and the drill interlock switch 196 returns to its normally closed position to complete the DC path for the drill solenoid 192 which is thereafter energized to release the cam disc 160 to begin the next drill cycle.

The above sequence is continued until the last drill cycle has been completed. Thereafter as the index plate 52 is approaching its starting position during the final index cycle, a finished program switch 206, which is normally held open in an operating position behind the index plate 52, is momentarily closed by a dimple 208 formed in the back of the index plate 52 (FIG. 3) to energize the program control relay 186. The program control relay 186 thus energized is locked out through its lower, normally open contact and lead 189 thereby breaking the electrical connection to the index motor 56, the cam motor 162 and the entire cycle control circuit 178 to stop further cycling.

The program control relay 186 will remain energized and the finished nose piece may then be removed and another nose blank may be inserted in complete safety without danger of the machine recycling until such time as the restart button 184 is actuated to de-energize the program control relay 186 and to initiate a subsequent nozzle drilling operation, it being understood that the index motor 56 will cause the index plate to rotate until index pin 74 lodges in starting slot 72 to locate the index plate for the initial drill cycle and reopen switch 206.

If desired, suitable indicators of various types may be incorporated in the machine such as the lamp 210, for example, connected across the power terminals in series with the normally open contacts of the program control relay 186 to provide a visual signal indicating a finished program.

As will be apparent to persons skilled in the art, various modifications and adaptations of the structure above described will become readily apparent without departure from the spirit and scope of the invention, the scope of which is defined in the appended claims.

I claim:

1. An apparatus for drilling discharge orifices in the tip of a fuel injection nozzle and comprising a frame, a drill mechanism mounted to the frame having a fixed drilling axis, a workpiece positioning device supported on the frame having a power operated index plate mounted for rotation, means for adjustably positioning the index plate with the rotational axis thereof intersecting the drilling axis in a predetermined angular relationship, and a chuck attachable to the index plate for holding the nozzle tip at the intersection of the rotational axis of the index plate and the drilling axis with the longitudinal axis of the nozzle tip offset at a preselected angle to the rotational axis of the index plate for selective drilling of the discharge orifices.

2. An apparatus for drilling discharge orifices in the tip of a fuel injection nozzle and comprising a frame, a drill mechanism mounted to the frame having a fixed drilling axis, an index plate supported for rotation on the frame, means for adjustably positioning the index plate with its rotational axis intersecting the drilling axis of the drill mechanism in a predetermined angular relationship, a chuck adjustably attachable to the index plate for holding the nozzle tip with the longitudinal axis thereof offset at a preselected angle to the rotational axis of the index plate, and a workpiece anvil engageable with the nozzle tip for supporting the tip at the point of intersection of the rotational axis of the index plate and the drilling axis.

3. An apparatus for drilling discharge orifices in the tip of a fuel injection nozzle and comprising a frame, a drill mechanism having a fixed drilling axis provided by a drill holder secured to the frame and a rotary spindle longitudinally reciprocable between an advanced and a retracted position in the drill holder, an index plate supported for rotation on the frame, means for adjustably positioning the index plate with its rotational axis intersecting the drilling axis in a predetermined angular relationship, a chuck adjustably attachable to the index plate for holding the nozzle tip with its longitudinal axis offset at a preselected angle to the rotational axis of the index plate, a workpiece anvil engageable with the nozzle tip for supporting the tip at the point of intersection of the rotational axis of the index plate and the drilling axis, driving means for rotating the index plate when the spindle is in a retracted position, and means for stopping the rotation of the index plate in a plurality of positions angularly spaced apart from one another such that the nozzle tip is selectively positioned for the drilling of a plurality of discharge orifices.

4. In an apparatus having a frame and a drill mechanism fixed to the frame for drilling a plurality of discharge orifices in the tip of a fuel injection nozzle, a workpiece positioning device comprising an L-shaped mounting bracket having a base plate pivotally secured at one end thereof to the frame and a wall at the other end of the base plate extending generally perpendicular thereto, a power operated index plate supported for rotation on the wall of the mounting bracket having holding means attachable to the index plate for holding the nozzle tip, means for adjustably positioning the index plate with the rotational axis thereof intersecting a drilling axis of the drill mechanism in a predetermined angular relationship, means for stopping the rotation of the index plate in a plurality of positions angularly spaced apart from one another, and a workpiece anvil engageable with the nozzle tip for supporting it at the point of intersection of the rotational axis of the index plate and the drilling axis.

5. The workpiece positioning device of claim 4 wherein the holding means include a chuck and an arcuate support secured to the index plate at its rotational axis, the chuck being attachable to the arcuate support for holding the nozzle tip with its longitudinal axis at a preselected angle to the rotational axis of the index plate.

6. In an apparatus for drilling discharge orifices in the tip of a fuel injection nozzle, indexing means mountable on a frame of the apparatus and comprising a circular index plate supported for rotation on the frame, the index plate having a plurality of slots angularly spaced apart from one another and extending radially inwardly from the periphery of the index plate, a pin supported on the frame engageable with the slots of the index plate for locking it against rotation in a plurality of different positions, driving means engageable with the index plate for applying constant torque thereto provide backlash control when the index plate is held by the pin, and actuating means operatively connected to the pin to release the index plate for rotation.

7. The indexing means of claim 6 wherein the actuating means include a solenoid and means for momentarily energizing the solenoid in response to a signal indicating the completion of the drilling of an orifice in the nozzle tip such that the index plate is released to rotate under the power of the driving means until an approaching slot passes the pin which is released thereby to extend into the last mentioned slot to lock the index plate against rotational movement for the drilling of the next orifice.

8. In an apparatus for drilling the tip of fuel injection nozzle, a drill mechanism mounted to a frame of the apparatus and comprising a support secured to the frame, a tubular drill holder fixed to the support, an actuating spindle supported for rotation within the drill holder longitudinally reciprocable therein between forward and rear positions, driving means for rotating the actuating spindle, said driving means being mounted by said support independently of said spindle and having a driving connection with said spindle which accommodates free lateral movement of said spindle relative to said driving means to eliminate the transmission of lateral forces therebetween and a drill operator for reciprocating the actuating spindle engageable in point contact with the rear end thereof to maintain the spindle free from lateral movement.

9. In an apparatus for drilling the tip of a fuel injection nozzle, a drill mechanism mounted to the frame of the apparatus and comprising a support secured to the frame, a drill holder fixed to the housing with forward and rear barrel segments projecting outwardly on opposite sides of the support, an actuating spindle supported for rotation within the drill holder longitudinally reciprocable therein between forward and rear positions, a spindle drive pulley supported for rotation on the rear barrel segment, and driving means for rotating the spindle including a pin and slot connection between the actuating spindle and the spindle drive pulley.

10. The drill mechanism of claim 9 wherein the driving means for rotating the actuating spindle include a motor having an output shaft, a pulley mounted on the output shaft, and an endless driving belt externally mounted on the pulley and the spindle drive pulley.

11. For use in drilling discharge orifices in the tip of a fuel injection nozzle having an annular necked down portion intermediate the ends of the tip forming a parti-spherical tip exceeding a hemisphere, an apparatus comprising a frame, a drill mechanism mounted to the frame having a fixed drilling axis, a power operated index plate supported for rotation on the frame, means for adjustably positioning the index plate with its rotational axis intersecting the drilling axis in a predetermined angular relationship, a chuck adjustably attachable to the index plate for holding the nozzle tip with its longitudinal axis offset at a predetermined angle to the rotational axis of the index plate, and a workpiece anvil engageable with the nozzle tip for supporting the tip with its necked down portion presenting a substantially flat surface to the drilling axis radially directed to the center of the tip at an angle of more than 90° with the longitudinal axis of the nozzle tip.

12. The apparatus of claim 11 further including means for stopping the rotation of the index plate in a plurality of positions angularly spaced apart from one another, and driving means engageable with the index plate for applyig constant torque thereto to provide backlash control when the index plate is being held against rotation.

13. In an apparatus for drilling the tip of fuel injection nozzle, a drill mechanism mounted to the frame of the apparatus and comprising, a support secured to the frame, a tubular drill holder fixed to the support, an actuating spindle supported for rotation within the drill holder longitudinally reciprocable therein between forward and rear positions, driving means for rotating the actuating spindle, a drill operator for reciprocating the actuating spindle engageable in point contact with the rear end thereof to maintain the spindle free from lateral movement, means for receiving a lubricating medium within the drill holder, and an advancing helical groove formed on the outer surface of said actuating spindle for propelling the lubricating medium toward the forward end of the drill holder when the actuating spindle is rotated, thereby to prevent entry of foreign particles into the drill holder during the drilling operation.

14. In an apparatus for drilling the tip of fuel injection nozzle, a drill mechanism mounted to a frame of the apparatus and comprising, a support secured to the frame, a tubular drill holder fixed to the support, an actuating spindle supported for rotation within the drill holder longitudinally reciprocable therein between forward and rear positions, driving means for rotating the actuating spindle, a drill operator for reciprocating the actuating spindle engageable in point contact with the rear end thereof to maintain the spindle free from lateral movement, and a power operated cam drivingly connected to the drill operator for controlling the advance of the actuating spindle to effect smooth engagement with the nozzle tip.

15. In an apparatus for drilling the tip of a fuel injection nozzle, a drill mechanism mounted to a frame of the apparatus and comprising a support secured to the frame having a cover portion providing rearwardly extending side walls, a drill holder fixed to the housing with forward and rear barrel segments projecting outwardly on opposite sides of the housing, an actuating spindle supported for rotation within the drill holder longitudinally reciprocable therein between forward and rear positions, the actuating spindle having its rear end protruding from the rear barrel segment, and a drill operator for reciprocating the actuating spindle having a pivot plate supported on the side walls of the housing for pivotal movement toward and away from the rear barrel segment for engagement with the protruding rear end of the actuating spindle, and a power driven cam rotatably mounted on the frame for controlling the pivotal movement of the pivot plate, and a driving connection between the cam and the pivot plate including a cam follower engageable with the cam for actuation thereby during rotation of the cam, and a lever arm pivotally secured intermediate the ends thereof with one end fixed to the cam follower and the opposite end of the lever arm engaging the pivot plate thereby to control its position relative to the rear end of the actuating spindle and to establish a preselected rate of advancement for the actuating spindle.

References Cited
FOREIGN PATENTS
591,662   8/1947   Great Britain.

FRANCIS S. HUSAR, *Primary Examiner.*